May 3, 1960 W. E. BURNS, JR 2,935,564
EDUCATIONAL CODE DEVICE
Filed Aug. 23, 1956 2 Sheets-Sheet 1
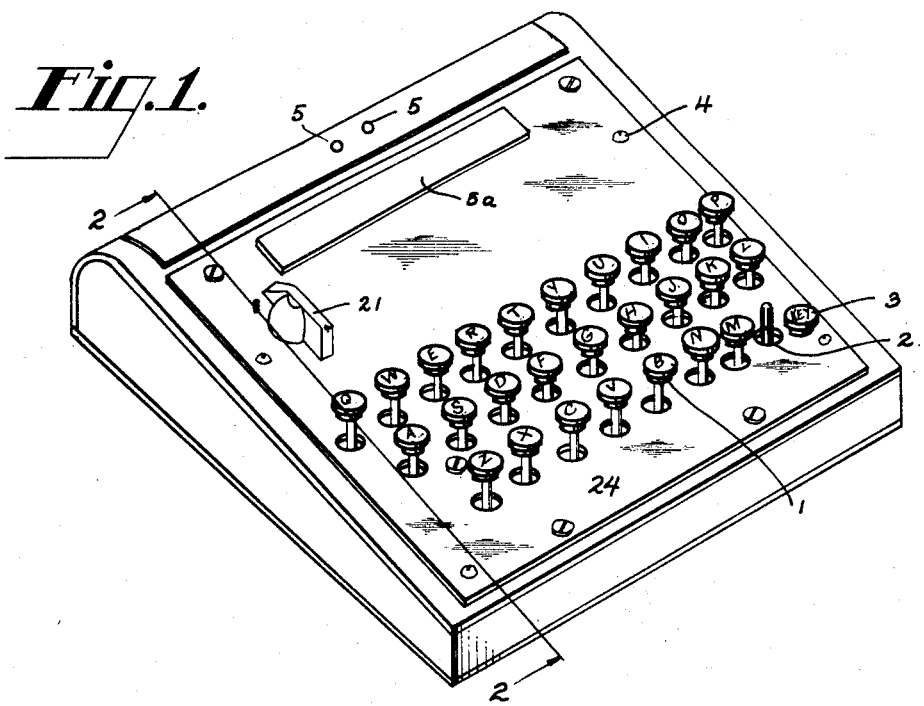
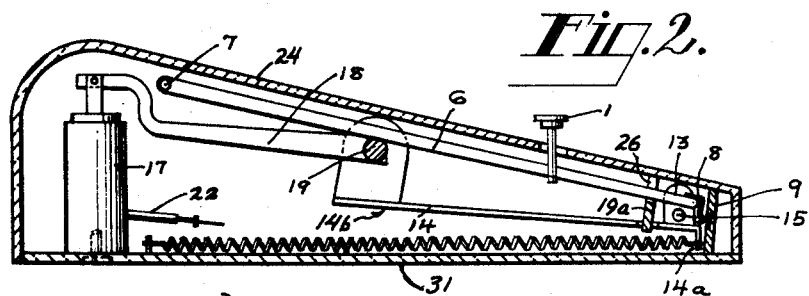
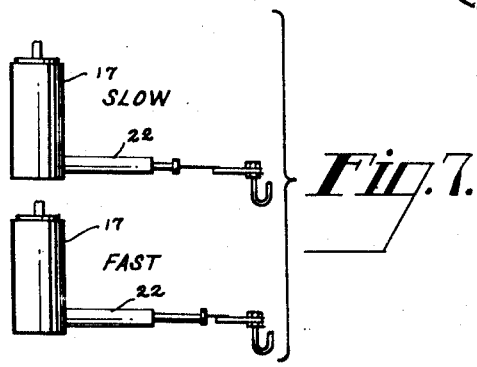
INVENTOR.
William E. Burns, Jr.
BY
Wm. G. Schmidt
ATTORNEY May 3, 1960  W. E. BURNS, JR  2,935,564
EDUCATIONAL CODE DEVICE
Filed Aug. 23, 1956  2 Sheets-Sheet 2
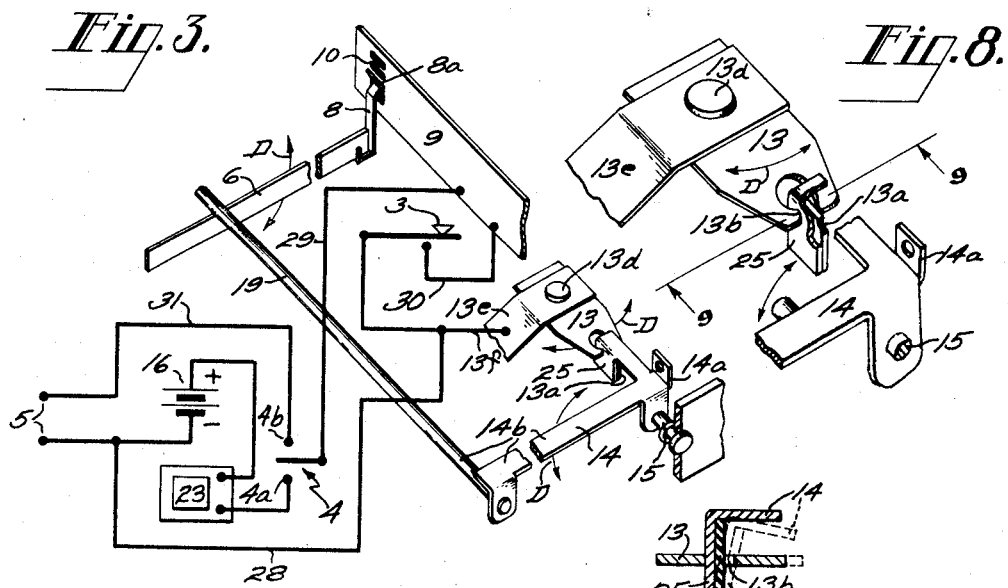
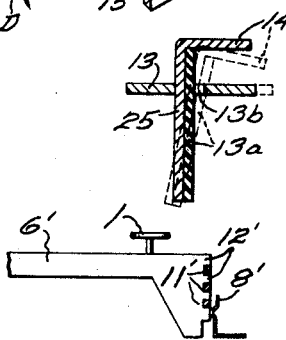
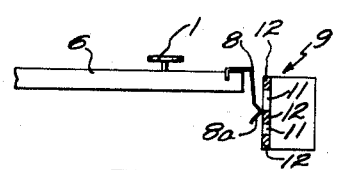
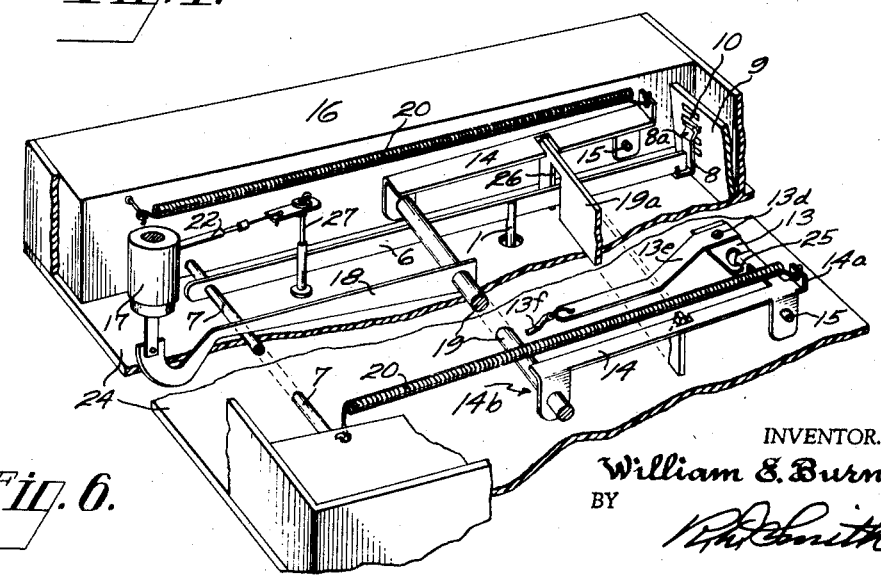
INVENTOR.
William E. Burns, Jr
BY

United States Patent Office 2,935,564
Patented May 3, 1960

2,935,564
EDUCATIONAL CODE DEVICE

William E. Burns, Jr., Philadelphia, Pa., assignor to The A. C. Gilbert Company, New Haven, Conn., a corporation of Maryland Application August 23, 1956, Serial No. 605,873

9 Claims. (Cl. 178—115)

This invention relates to code transmitters and educational code devices and has more particular reference to devices for sending and teaching Morse Code, Naval Code, and the like.

Another object of the device of this invention is to provide an educational toy for children in that they can learn the significance and the value of the dot and dash codes while they are engaged in play with one another.

A further object of this invention is the provision of the letters of an alphabet in an arrangement which is similar to the disposition of the keys on a standard typewriter. Accordingly, the possessor of this invention not only can acquire a knowledge of the Morse Code through the senses of sight and hearing, but can learn concomitantly the pattern of the keys on a conventional typewriter.

In addition, an object of the device of this invention is to provide an inexpensive means for transmitting code messages over considerable distances beyond the playroom or the study of a child by inserting into the circuit of the device certain accessory apparatus adapted to achieving such a purpose. Illustrative of the kind of accessory apparatus that may be thus utilized is an actual radio transmitter, capable of broadcasting distant signals. In addition to the aforesaid applied use of this invention, the device by virtue of the installation of an automatic key enables an inexperienced individual to send any kind of code over the air. Consequently, beginners and novices as well as more skillful professional operators can readily adjust their capabilities to the wide scope of this invention's potentiality and utility.

Other objectives and applications of this invention will become apparent from its following detailed description and the accompanying drawings in which like reference numerals indicate like parts of the device.

Fig. 1 is a perspective view of the device.

Fig. 2 is a sectional view of the device taken on line 1—1 in Fig. 1.

Fig. 3 is a schematic wiring diagram of the electrical circuits of the invention, the arrows indicating the direction of reciprocating swinging movement of certain current conducting mechanical parts.

Fig. 4 is an enlarged and fragmentary elevational view of the master plate and the contact portion of a key of the device.

Fig. 5 is an enlarged and fragmentary elevational view of a modified type of key and the contact portion of the master plate of the device.

Fig. 6 is a contracted perspective bottom view of the device with its base wall removed.

Fig. 7 is an elevational view of the speed controlling mechanism of the invention in two conditions of selective adjustment.

Fig. 8 is an enlarged perspective view of the circuit breaker viewed as in Fig. 6

Fig. 9 is a still further enlarged view of the switch contacts of the circuit breaker shown in section on the plane 9—9 in Fig. 8.

Referring to Fig. 1 of the drawings, code characters such as letters of the alphabet are marked on key depressing finger buttons indicated by 1, as in the instance of the letter B. These finger buttons are located in a typewriter-like pattern of keyboard relationship. In the event that a wrong key is struck while transmitting a signal or a message, a key 2 is installed for correcting such a contingency. Another key 3 is included among the assembly of keys and serves the significant purpose of transmitting numerals, punctuation signals, and other symbols not embraced by the other keys in the keyboard as designated. A name plate 5a or an equivalent is mounted on the case of the device and embodies instructions for a direct and an effective use of the apparatus. Simple reference to the directions thus set forth on the plate 5a facilitates an operator's transmission of dot and dash signals through the instrumentality of key 3. Yet equal in importance to this particular function is the use to which key 3 can be put by a novice when practicing his sending of code in the same manner that it is developed manually by a conventional telegraph key. As shown in Fig. 3, key 3 when depressed closes contact with the master plate 9 for this purpose. Moreover, it is occasionally desirable to use this device in the actual keying of a transmitter. To facilitate this function of the device a switch 4 is provided. By means of 3-position switch 4, the combination of battery 16 and buzzer 23 can be rendered inactive whenever the position of the switch is such as to by-pass the battery-buzzer unit in favor of the terminals 5. Thus, when a transmitter or some other auxiliary equipment is properly attached to the terminals 5, then the device of this invention will automatically key said transmitter or the like. Furthermore, switch 4 conveniently provides for an off position indicated in Fig. 3 for the purpose of avoiding any accidental operation of the device.

Referring to Fig. 2, code character key 6 is one of a plurality of similar keys which swing on and relatively to rod 7 with limited downward displacement from a normal raised position about a common axis established by said rod. Rod 7 is stationed in the shallow quadrilateral case or framework of the device and runs transversely across the apparatus at the rear of the case as a means for mounting keys 6 therein. The case has a horizontal base 31 and a sloping top panel 24. The other keys necessary to complete the alphabet and to furnish special signals are similarly mounted for swinging movement on and relative to rod 7. All of the keys pass through guide slots 26 in an insulative fin-like partition 19a fixed in the case and extending transversely across the device. To illustrate one means for generating coded electrical impulses a leaf spring contact 8 serving as a movable circuit terminal is conductively carried on the free or movable end of each of keys 6, and its contact surface 8a wipes along a code track 10 extending in a corresponding path crosswise the master plate 9 whenever a selected key button like 1 is depressed by the operator's finger. Thus the mounting of leaf spring 8 on the end of key 6 is illustrative of various motion transmitting means that might serve to connect each impulse generator with a different one of the keys. The master plate 9 presents a row of such code tracks spaced lengthwise of the plate. Each of these tracks is discontinuously conductive because having a series of conductive segments 12 separated by insulating spaces 11 impressed or printed on the inner surface of the plate 9. The row of code tracks extends from one side of the device to the other along plate 9. The arrangement of the conductive segments 12 and the insulating spaces 11 corresponds to specific requirements of the symbols of the code that is being self-taught.

In the preferred embodiment, the circuit interrupting spring contacts 8a of all keys 6 are alike and the code tracks 10 of the master plate, by virtue of the differing lengths and spacing of segments and spaces, determine the dots and dashes that are characteristic of the conventional signals of a given code. Fig. 5 indicates a modified construction of the spring contact and master plate relationship. In Fig. 5, the master plate is replaced with a plurality of spring leaf contacts 8'. In this optional construction the keys 6' are machined with alternating conductive segments 12 and insulated spaces 11 or configurations.

Adverting to the preferred embodiment of the spring contact and master plate relationship in Fig. 4, whenever the selected key 6 is depressed, its contact surface 8a moves across a specific area of conductive segments 12 and insulating spaces 11 in the corresponding code track of the master plate 9 and makes its intermittent electrical contact with several of the conductive segments in the signal track, thus causing the signal characteristic of the selected key to be emitted.

In Fig. 4 (and Fig. 5 for the modified construction), the relationship of the master plate 9 and a spring contact 8 with its contact surface 8a is enlarged for the purpose of imparting clarity and simplicity to an exposition of its functional application. As previously mentioned, when through the choice of a key a specific code track on the master plate 9 is wiped by the key carried contact surface 8a, only those parts of the master plate code track presenting bright metal allow for completion of the electrical circuit to a buzzer 23 on the upward or return stroke of the key 6. The "machined-out" or insulated parts in each signal track of the master plate necessarily cause a discontinuance of current flow through the buzzer circuit. The longer expanses of metal, as illustrated in Fig. 4, give rise to the dashes of the code; whereas the dots of the code are represented by the shorter lengths of metal on the master plate. It is an important feature of this invention that the design of the contact surface 8a of the key and of the master plate 9 involves a frictional contact between these respective areas, which imparts a self-cleaning and brightening function to the moving parts. Of equal (if not greater) importance to the self-cleaning effect resulting from this constructive or "friendly" friction is the role of the latter in preventing all of the keys from dropping (due to the pull of gravity), excepting only that key selected and depressed by the operator of the device.

Prerequisite to sounding a well timed signal or to flashing a light (in the case of an operator with an impaired auditory sense), the device must incorporate a mechanism 17, 18, 22 that governs a return stroke of the contact surface 8a at a controllable and a predetermined constant speed. A circuit breaker 13 is inserted in the line and allows current to flow to the buzzer 23 only on the return or upward travel in Figs. 2, 4 and 5 (downward direction in Figs. 3, 6 and 8) of the contact 8a. On a down stroke of key 6 and contact surface 8a (upward direction in Figs. 3, 6 and 8) the insulated facing 13a of the circuit breaker 13, prevents a flow of current to the buzzer or the light and a resultant formation of any kind of signal as is hereinafter more fully described.

The following recital of the stepwise events occurring when a key 6 is depressed discloses a series of casual relationships and of coordinated movements. Manual pressure on button 1 impels a small downward movement of the key 6 about its axis of rotation 7. With this movement of key 6, the key-returning lifter rack 14b is actuated to move counterclockwise in Fig. 2 (clockwise in Figs. 3, 6 and 8) about the pivot studs 15 fixed in the casing because of the pressure of key 6 against the transverse rod 19 which is a solid part of the rack 14b. This sets up an engageable relation of rack 14b to all of the keys 6. Bar 14, extension arm 18 and rod 19 are collectively designated lifter rack 14b. Rack 14b thus swings about the stationary common axis of studs 15 that is parallel with and eccentric to the axis of rod 7. The forked contact 13 or shiftable member of the aforementioned circuit breaker simultaneously and limitedly swings about its stationary pivotal point 13d when it is actuated by a conductive tab 25 which is a part of the lifter rack 14b. In Fig. 9 the circuit breaker contact 13 receives thrust toward the right from an insulated surface 13a on tab 25 which prevents a flow of current from battery cells 16 on a stroke downward in Fig. 2 of each key 6 (upward direction in Figs. 3, 6 and 8). Extension arm 18, a part of the lifter rack 14b, is rigid on transverse rod 19 and simultaneously depresses the dash pot plunger in pneumatic timer 17, which by virtue of its contained flapper valve, allows a rapid and relatively free escape of air. As described previously, lifter rack 14b comprises bars 14 with their bent down spring anchorage lips 14a, extension arm 18, transverse rod 19, and tab 25 as an electrically conductive unit. By moving in an arc about pivot stud 15, tab 25 actuates circuit breaker 13. The forked contact of circuit breaker 13 is constructed in a way to let tab 25 and its insulative facing 13a protrude between the spaced apart conductive extremities of the forked contact with a definite and prescribed clearance shown at 13b in Fig. 9. Accordingly, when lifter rack 14b rotates clockwise about its pivot 15 in Fig. 8, tab 25 will move circuit breaker contact 13 which is frictionally mounted on its pivot 13d. The circuit breaker 13 is in electrical contact with a metal plate 13e which is attached to the bottom wall of the case and to which is joined the wire 13f leading to the battery. The role of friction is a prerequisite to making a good contact on a return stroke and to a definite break as tab 25 leaves the non-insulated surface 13b on a down stroke.

On the up or return stroke of key 6 and the several elements coupled with the key, it is the tension in springs 20 anchored to the case and acting through lifter rack 14b that provides the motivating energy for their upward travel by biasing the lifter rack to swing in its key returning direction. At the same time, circuit breaker 13 is actuated to present its metallic point 13b in contact with conductive metal of tab 25 to complete the circuit to battery cells 16 and, as contact surface 8a slides over the non-insulated and the insulated spaces of its code track on master plate 9, the intermittent contacts between the contact surface 8a and the non-insulated spaces 12 on the master plate 9 give rise to periodic currents or electrical impulses though the lamp or buzzer circuit whereby sounds of dots and dashes or short and long flashes of light are emitted.

Fig. 8 makes clear that when a key 6 is depressed by means of its button 1, and thereby causes lifter rack to swing clockwise in Figs. 6 and 8, the clearance 13b between the insulative facing 13a of tab 25 shown in Fig. 9 permits the conductive surface of the tab to separate from the contact point 13b of the circuit breaker. This cuts out the circuit to battery cells 16 and prevents automatic keying by the code track and contact spring 8 on the downward stroke of the key (upward direction in Figs. 3, 6 and 8). This also temporarily shoves the tab 25 and circuit breaker contact 13 to their broken line positions in Fig. 9 where only the insulative facing 13b and not any conductive metal of tab 25 is engaged with the circuit breaker contact 13.

Fig. 6 indicates that a single timer 17, a single circuit breaker 13, and a single lifter rack 14b are common to all of the keys projecting through the panel 24 of this invention. Accordingly, all code signals can be transmitted at a pre-determined and uniform speed. Nevertheless, the speed with which audible and visual signals are emitted can be varied—a provision of incalculable benefit to the novice as he improves from the clumsiness of a slow and inapt tyro to the speedy technique of a proficient operator. In Fig. 1, the drawing indicates that a knob 21 is mounted on the panel 24 of this device. Knob 21 rotates a shaft 27 which moves a plunger in and out of a needle valve 22. Rotation of knob 21 in a manner that thrusts the plunger into the needle valve 22 renders the return time of the piston within the timer 17 longer in duration and the return stroke of the several elements linked with lifter rack 14b slower in speed. When the knob 21 is rotated in the opposite direction, the plunger is withdrawn from needle valve 22 enabling air to flow more readily into cylinder 17. Thus, the piston returns more rapidly and the return stroke of the bar assembly 14b and the various mechanical parts coordinated with it is accelerated. Within limits, the speed of propagation of code signals—be they sound or light—can be appreciably varied. Obviously, it is advantageous for the purposes of self-instruction to give to a learner an opportunity for protracting the time period for the formation of his initial dots and dashes—and, with the improvement that follows practice, a chance for speeding up his transmission of the signals of a code, whereby a learner can soon acquire a discriminating differentiation between fumbling effort and acceptable accomplishment. The source of energy for the mechanism of this device is derived from two flash light cells 16 and is sufficient to give many hours of self-instruction to a student.

The complete diagram of circuit connections in Fig. 3 shows that optional circuits may be set up. When switch 4 closes its contact 4a there results the following utilization circuit namely battery 16, buzzer 23, switch 4, master plate 9, coded impulser 8, 10, conductive mechanical parts 6, 19, 14, 25, one way circuit breaker 13, back to battery through line 28. It has been explained how this limits the coded impulsing of buzzer 23 to only the upward stroke of key 6 (in downward direction in upside down views in Figs. 3, 6 and 8). The other optional circuit is from device terminal 5, through switch 4b to master plate 9, thence through 30 to the telegraph key 3 and through line 28 to the other device terminal 5. In this circuit condition the entire device performs only as a switch for keying a transmitter or signal sending apparatus that may be attached electrically to device terminals 5, 5 and the buzzer 23 and battery 16 may remain inactive.

Presumptively, a number of variations and modifications of this invention may be made without departing from the spirit and the scope thereof; and, accordingly, only such limitations should be imposed as are indicated by the appended claims.

I claim:

1. In an educational device for signaling by coded electrical impulses, the combination of, framework for the device, a plurality of selectively operable code character keys, means mounting said keys on said framework in a manner to swing about a common straight axis, finger buttons located in a typewriter-like pattern on said frame connected respectively to said keys in a manner to cause swinging displacement of individual keys from normal position, at least one key-returning rack, means mounting said rack on said framework in a manner to swing about a stationary axis parallel with and eccentric to said common pivotal axis in engageable relation to said keys, whereby to swing the latter to said normal position in a return direction, resilient means biasing said rack to swing in said key-returning direction, an electric circuit for utilizing coded electrical impulses, a plurality of electrical impulse generators in said circuit each including a circuit terminal and a discontinuously conductive electrical code track arranged for relative movement while in electrically cooperative relationship, and motion transmitting means connecting each of said impulse generators with a different one of said keys in a manner to cause said relative movement upon displacement and release of each of said keys, whereby each of said generators feeds selected coded impulses into said utilization circuit.

2. In an educational device for signaling by coded electrical impulses, the combination defined in claim 1, together with a circuit breaker in the said utilization circuit including contacts electrically connected to make and break said circuit, and a shiftable member carrying one of said contacts and directly engageable by the said key-returning rack in a manner to maintain said contacts closed during swinging movement of said rack in direction to return the said keys to normal position and to maintain said contacts open during swinging movement of said rack in the opposite direction.

3. In an educational device for signalling by coded electrical impulses, the combination defined in claim 1, together with a dashpot mechanically connected with the said key-returning rack at a point intermediate the said common axis and the said stationary axis in a manner to oppose and retard the key-returning movement of said rack.

4. In an educational device for signaling by coded electrical impulses, the combination defined in claim 1, together with a circuit interrupter in the said utilization circuit including contacts electrically connected to make and break said circuit, a shiftable member carrying one of said contacts and directly engageable by the said key-returning rack in a location close to the said stationary axis about which said lever swings in a manner to maintain said contacts closed during swinging movement of said rack in direction to return the said keys to normal position and to maintain said contacts open during swinging movement of said rack in the opposite direction, and a dashpot mechanically connected with said lever at a point beyond the said common axis from the said stationary axis about which said rack swings in a manner to oppose with a maximum range of retarding movement the key-returning movement of said rack induced by the said resilient means.

5. An educational code device comprising a relatively shallow quadrilateral case having a horizontal base and a sloping top panel, a gang of finger depressible buttons arranged in the fashion of a typewriter key-board above said panel, a plurality of keys topped respectively by said buttons and mounted to swing individually about a common axis extending transversely of the rear portion of said case, a key lifting rack underlying said keys in position to engage and lift the same mounted to swing about an axis eccentric to said common axis and extending transversely of the front portion of said quadrilateral shape, a rack lifting coil spring anchored to said case at said rear portion thereof and extending under tension along said horizontal base to said front portion thereof, and an anchorage on said rack to which said spring is attached at a point below said eccentric axis, whereby the tension in said spring biases said rack to swing in key lifting direction, and a plurality of means for generating selective different coded signals responsively to the manual depression and spring caused lifting of each of the respective keys.

6. An educational code device as defined in claim 5, together with a common electrical circuit branched to include each of the said plurality of means for generating coded signals, and terminals in said circuit adapted for the electrical attachment thereto of signal sending apparatus whereby said apparatus can be keyed by said device.

7. An educational code device as defined in claim 5, in which each of the said plurality of means for generating coded signals includes a discontinuously conductive electrical code track stationed in said case, and a traveling contact carried by each of the said keys in position to cooperate electrically with a different one of said stationary code tracks, together with a utilization circuit containing all of said code tracks and said cooperative traveling contacts for transmitting said coded signals, 8. An educational code device as defined in claim 5, in which each of the said plurality of means for generating coded signals includes a traveling discontinously electrical conductive code track carried by each of the said keys, and contacts stationed in the said case in position to cooperate electrically with a different one of said traveling code tracks, together with a utilization circuit containing all of said code tracks and said cooperative contacts for transmitting said coded signals.

9. An educational code device as defined in claim 5, together with a common utilization circuit including all of the said plurality of means for generating coded signals, and an audible signal reproducer in said utilization circuit.

References Cited in the file of this patent

UNITED STATES PATENTS

| | | |
|---|---|---|
| 515,709 | Houck et al. | Feb. 27, 1894 |
| 774,724 | Gilmore | Nov. 8, 1904 |
| 846,464 | Gentile | Mar. 12, 1907 |
| 2,458,550 | Baulch | Jan. 11, 1949 |
| 2,509,170 | Rousey | May 23, 1950 |
| 2,573,514 | Turner | Oct. 30, 1951 |
| 2,587,399 | Smith | Feb. 26, 1952 |
| 2,723,846 | Holder et al. | Nov. 15, 1955 |

FOREIGN PATENTS

| | | |
|---|---|---|
| 623,591 | France | Mar. 21, 1927 |